United States Patent
Lee et al.

(10) Patent No.: US 10,496,141 B2
(45) Date of Patent: Dec. 3, 2019

(54) SYSTEM AND METHOD FOR INTELLIGENT THERMAL MANAGEMENT IN A SYSTEM ON A CHIP HAVING A HETEROGENEOUS CLUSTER ARCHITECTURE

(71) Applicant: QUALCOMM INCORPORATED, San Diego, CA (US)

(72) Inventors: Kwangyoon Lee, San Diego, CA (US); Adam Cunningham, San Diego, CA (US); Ronald Alton, Oceanside, CA (US)

(73) Assignee: Qualcomm Incorporated, San Diego, CA (US)

( * ) Notice: Subject to any disclaimer, the term of this patent is extended or adjusted under 35 U.S.C. 154(b) by 40 days.

(21) Appl. No.: 15/073,431

(22) Filed: Mar. 17, 2016

(65) Prior Publication Data

US 2017/0269652 A1    Sep. 21, 2017

(51) Int. Cl.
 G06F 1/32 (2019.01)
 G06F 1/20 (2006.01)
 G06F 1/3206 (2019.01)
 G06F 1/3287 (2019.01)
 G06F 1/3234 (2019.01)

(52) U.S. Cl.
 CPC ............ G06F 1/206 (2013.01); G06F 1/3206 (2013.01); G06F 1/3243 (2013.01); G06F 1/3287 (2013.01); Y02D 10/152 (2018.01)

(58) Field of Classification Search
 CPC ........ G06F 1/206; G06F 1/3206; G06F 1/324; G06F 1/3287; G06F 1/329; G06F 9/5094; G06F 1/3243; Y02B 60/1217; Y02B 60/1275; Y02B 60/1282; Y02B 60/142; Y02B 60/144; Y02D 10/152
 See application file for complete search history.

(56) References Cited

U.S. PATENT DOCUMENTS

| | | | |
|---|---|---|---|
| 8,595,731 B2 | 11/2013 | Bose et al. | |
| 8,874,941 B2 | 10/2014 | Chakraborty et al. | |
| 8,972,759 B2* | 3/2015 | Doshi | G06F 1/3203 713/320 |
| 9,116,690 B2 | 8/2015 | Trautman et al. | |
| 9,588,577 B2* | 3/2017 | Ahn | G06F 1/3293 |
| 2007/0156370 A1* | 7/2007 | White | G06F 1/206 702/132 |
| 2008/0005591 A1* | 1/2008 | Trautman | G06F 1/3203 713/300 |

(Continued)

OTHER PUBLICATIONS

International Search Report and Written Opinion—PCT/US2017/018227—ISA/EPO—dated Feb. 26, 2018.

(Continued)

*Primary Examiner* — Fahmida Rahman
(74) *Attorney, Agent, or Firm* — Smith Tempel Blaha LLC

(57) ABSTRACT

Various embodiments of methods and systems for intelligent thermal power management implemented in a portable computing device ("PCD") are disclosed. To mitigate or alleviate unwanted workload migration that could exacerbate a thermal energy generation event in a processing component having heterogeneous processing core clusters, embodiments of the solution apply mitigation measures in a predetermined order to the large cluster before applying any thermal mitigation measures to the small cluster.

18 Claims, 6 Drawing Sheets

(56) References Cited

U.S. PATENT DOCUMENTS

| | | | |
|---|---|---|---|
| 2009/0094438 A1* | 4/2009 | Chakraborty | G06F 1/3203 |
| | | | 712/30 |
| 2014/0173311 A1* | 6/2014 | Park | G06F 1/206 |
| | | | 713/320 |
| 2015/0121105 A1 | 4/2015 | Ahn et al. | |
| 2015/0134995 A1 | 5/2015 | Park et al. | |
| 2017/0160785 A1* | 6/2017 | Mittal | G06F 1/324 |

OTHER PUBLICATIONS

Muthukaruppan T.S., et al., "Hierarchical Power Management for Asymmetric Multi-Core in Dark Silicon Era", May 29, 2013-Jun. 7, 2013, May 29, 2013 (May 29, 2013), XP058020230, DOI: 10.1145/2463209.2488949, ISBN: 978-1-4503-2071-9, pp. 1-9.
Partial International Search Report—PCT/US2017/018227—ISA/EPO—dated Dec. 15, 2017.

\* cited by examiner

SYSTEM AND METHOD FOR INTELLIGENT THERMAL MANAGEMENT IN A SYSTEM ON A CHIP HAVING A HETEROGENEOUS CLUSTER ARCHITECTURE

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat producing components are not positioned proximally to one another. Many PCDs may also rely on passive cooling devices, such as heat sinks, to manage thermal energy among the electronic components which collectively form a respective PCD.

The reality is that PCDs are typically limited in size and, therefore, room for components within a PCD often comes at a premium. As such, there rarely is enough space within a PCD for engineers and designers to mitigate thermal degradation or failure of processing components by using clever spatial arrangements or strategic placement of passive cooling components. Therefore, systems and methods may rely on various temperature sensors embedded on the PCD chip and elsewhere to monitor the dissipation of thermal energy and then use the measurements to trigger application of thermal power management techniques that adjust workload allocations, processing speeds, etc. to reduce thermal energy generation.

Thermal power management techniques used on a PCD chip having a processor cluster with a homogeneous architecture are relatively straightforward in that a single temperature threshold may be used to trigger application of the thermal management technique to the entire processor cluster. When a PCD chip has a processor cluster with a heterogeneous architecture, however, effective thermal management can be more difficult to achieve. For example, thermal management techniques known in the art, when applied to a PCD chip having a heterogeneous processor cluster, can cause unintended migration of workloads from one cluster to another which, in turn, can exacerbate the very thermal event that triggered application of the thermal technique in the first place.

Therefore, what is needed in the art is a system and method for intelligent thermal management of a temperature in a PCD having a heterogeneous processor architecture. More specifically, what is needed in the art is a system and method that manages a temperature in a PCD having a heterogeneous processor architecture without causing unintended migration of workloads between processor clusters.

SUMMARY OF THE DISCLOSURE

Various embodiments of methods and systems for intelligent thermal management techniques implemented in a portable computing device ("PCD") are disclosed. An exemplary embodiment of a method for intelligent thermal management comprises defining a large cluster of processing cores and a small cluster of processing cores such that the small cluster has a peak performance capacity that is less than the peak performance capacity of the large cluster. A temperature reading generated by a target temperature sensor is monitored and compared to a temperature threshold. In certain embodiments, the temperature threshold may be associated with a skin temperature of the PCD.

If the method determines that the temperature reading exceeds the temperature threshold, a first subset of the large cluster processing cores may be taken offline such that the peak performance capacity for the large cluster is reduced to that which is defined by a second subset of the large cluster processing cores that remains online. Subsequently, if the method determines that the temperature reading is less than the temperature threshold (I.e., that taking the first subset of the large cluster processing cores offline worked to sufficiently reduce thermal energy generation and dissipation), then the first subset of the large processing cores may be brought back online.

If, after the first subset of the large cluster processing cores was taken offline, the method determines that the temperature reading remains in excess of the temperature threshold, then the performance of the second subset of the large cluster processing cores may be throttled. Subsequently, if the method determines that the temperature reading is less than the temperature threshold (I.e., that throttling the second subset of the large cluster processing cores worked to sufficiently reduce thermal energy generation and dissipation), then the throttling of the second subset of the large processing cores may be discontinued (and the first subset of the large cluster processing cores brought back online, if the temperature stays below the threshold after throttling of the second subset is discontinued).

If the method determines that the temperature reading still exceeds the temperature threshold after the second subset of the large cluster processing cores was throttled to a minimum performance floor, then the method may take the second subset of the large cluster processing cores offline. Subsequently, if the method determines that the temperature reading is less than the temperature threshold (I.e., that taking the second subset of the large cluster processing cores offline worked to sufficiently reduce thermal energy generation and dissipation), then the second subset of the large processing cores may be brought back online (and throttled, if need be).

If, after the second subset of the large cluster processing cores was taken offline, the method determines that the temperature reading remains in excess of the temperature threshold, then the performance of the small cluster processing cores may be throttled. Subsequently, if the method determines that the temperature reading is less than the temperature threshold (I.e., that throttling the small cluster processing cores worked to sufficiently reduce thermal energy generation and dissipation), then the throttling of small processing cores may be discontinued (and the second subset of the large cluster processing cores brought back online and throttled, if the temperature stays below the threshold).

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
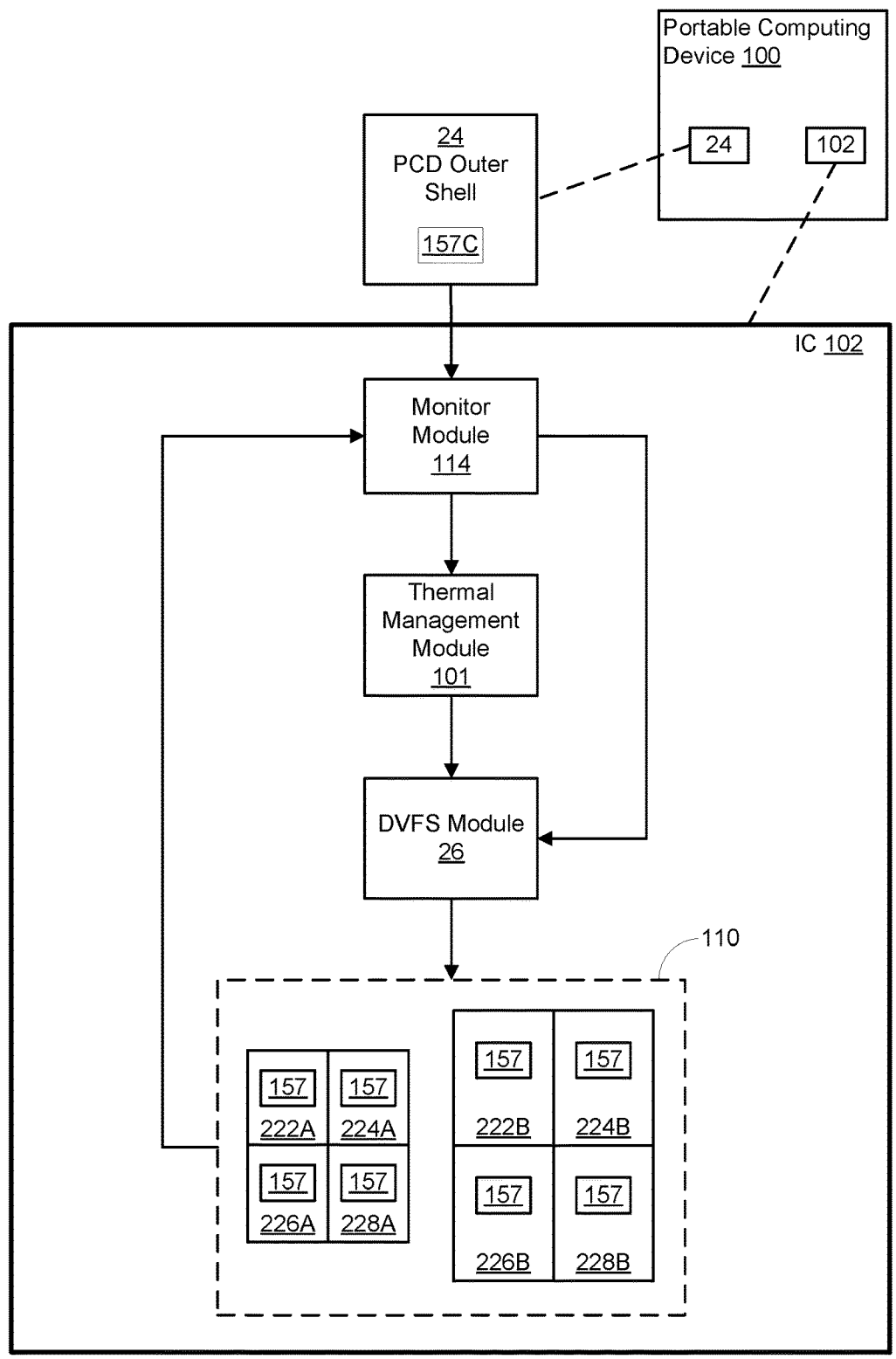
FIG. 1 is a functional block diagram illustrating an embodiment of an on-chip system for implementing intelligent thermal management of a temperature in a portable computing device ("PCD") having a heterogeneous processor cluster architecture.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component," "thermal aggressor" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)." Additionally, to the extent that a CPU, DSP, GPU, chip or core is a functional component within a PCD that consumes various levels of power to operate at various levels of functional efficiency, one of ordinary skill in the art will recognize that the use of these terms does not limit the application of the disclosed embodiments, or their equivalents, to the context of processing components within a PCD.

In this description, reference to a CPU or the like refers to a processor having a heterogeneous architecture of multiple processing clusters, unless otherwise noted. For illustrative purposes, exemplary embodiments of the solution are described within the context of a CPU having a "large cluster" and a "small cluster" of processing cores. Even so, it is envisioned that embodiments of the solution may be applicable within systems on a chip having heterogeneous processor architectures comprised of more than two dissimilar clusters and, as such, the scope of the solution is not limited to just heterogeneous processor architectures comprising only a large cluster and a small cluster.

In this description, the term "instructions per cycle" or "IPC" refers to the average number of instructions that may be executed by a given processor cluster for a single clock cycle. As such, the IPC for a given processor cluster is dependent upon the architecture of the cluster. Generally, a "large" cluster will have an IPC rating that exceeds that of a "small" cluster. Further, the term "CPU capacity" is used herein to represent the peak performance possible for a given processor cluster with respect to the cluster's IPC and maximum allowed power frequency. Moreover, CPU capacity for a given cluster may be defined in view of the IPC associated with the least performing core in the given cluster.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component, i.e. a "thermal aggressor." For example, the "temperature" of two components is the same when the two components are in "thermal" equilibrium.

In this description, the terms "workload," "process load," "process workload," "use case workload" and the like are used interchangeably and generally directed toward the processing burden, or percentage of processing burden, associated with a given processing component, or cluster of processing components, in a given embodiment. Further, "workload migration" is used herein to refer to the tendency for workloads to be transferred from a first processing component to a second processing component when the operating parameters of the second processing component are more favorable for processing the workload.

In this description, the terms "thermal mitigation technique(s)," "thermal policies," "thermal power management," "thermal mitigation measure(s)," "throttling" and the like are used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals. Embodiments of the solution may comprise a particular thermal mitigation technique or approach applicable within a SoC having a heterogeneous processor cluster architecture and useful for preventing unwanted migration of a workload from one processor cluster to another.

In this description, the term "performance floor" refers to a lowest allowable performance level, or processing speed, to which a dynamic voltage and frequency scaling ("DVFS") module may throttle a given processor and/or processor cluster. Embodiments of the solution may dynamically adjust a performance floor depending on various parameters and to prevent unwanted migration of a workload from one processor cluster to another.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Managing thermal energy generation in a PCD having a heterogeneous processor cluster architecture, without unnecessarily impacting quality of service ("QoS"), can be accomplished by monitoring one or more sensor measurements that correlate with the outer shell temperature, i.e. "skin" temperature, of the PCD. By closely monitoring the skin temperature, an intelligent thermal management solution in a PCD may systematically adjust performance settings of active processing components in heterogeneous clusters in an effort to optimize user experience while managing thermal energy generation. Advantageously, by smartly adjusting performance settings for thermally aggressive processing components associated with different and heterogeneous processor clusters, intelligent thermal management systems and methods can optimize QoS without causing a critical temperature measurement (such as a PCD outer shell temperature) to be exceeded.

Notably, although exemplary embodiments of intelligent thermal management methods are described herein in the context of managing a "skin temperature" or "outer shell temperature" of a PCD, application of intelligent thermal management methodologies according to the solution are not limited to skin temperature applications. It is envisioned that embodiments of intelligent thermal management methods, for example, may be extended to any temperature/temperature sensor within a system on a chip ("SoC") such as, but not limited to, core junction temperatures.

Embodiments of the solution intelligently throttle dissimilar processor clusters to avoid unintended workload migration from a smaller cluster to a larger cluster. Certain embodiments of the solution avoid unintended workload migration from a smaller processor cluster to a larger processor cluster by keeping the power frequency supplied to the smaller cluster higher than that of the larger cluster. Other aspects and advantages of embodiments of the intelligent thermal management solution will be apparent from the figures, description and claims that follow.

FIG. 1 is a functional block diagram illustrating an embodiment of an on-chip system 102 for implementing intelligent thermal management of a temperature in a portable computing device ("PCD") 100 having a heterogeneous processor cluster architecture 110. Advantageously, by throttling a small processor cluster in view of thermal mitigation steps applied to a large processor cluster, embodiments of intelligent thermal management the systems and methods may address excess generation of thermal energy affecting skin temperature of the PCD 100 without overly impacting the overall user experience ("Ux") or exacerbating a thermal event by unintended workload migration.

In general, the system employs three main modules which, in some embodiments, may be contained in one or two modules: (1) a dynamic frequency and voltage scaling ("DVFS") module 26 for throttling performance levels of processing components in a heterogeneous CPU 110 that includes multiple processor clusters of differing active CPU capacities; (2) a monitor module 114 for monitoring temperature readings from a target temperature sensor(s) and performance settings; and (3) a Thermal Management ("TM") module 101 for determining thermal mitigation measures and working with the DVFS module 26 to throttle thermally aggressive processing components according to the solution. Advantageously, embodiments of the system and method that include the three main modules optimize the overall Ux regardless of use case workload while maintaining skin temperatures beneath acceptable thresholds.

In the exemplary embodiment of FIG. 1, monitor module 114 monitors various performance levels and settings associated with thermally aggressive processing component CPU 110. As depicted in the FIG. 1 illustration, CPU 110 is a heterogeneous processing component comprised of multiple cores 222, 224, 226, 228 organized into a small cluster (222A, 224A, 226A, 228A) and a large cluster (222B, 224B, 226B, 228B). Any one or more of the cores 222, 224, 226, 228 may be generating excess thermal energy that, when dissipated, affects the outer surface temperature (i.e., the skin temperature) of the PCD outer shell 24. Also, the monitor module 114 monitors temperature sensor 157C associated with the outer shell 24. The monitor module 114 may relay data indicative of the active performance level settings of the CPU 110 and/or the skin temperature measured by the sensor 157C to the TM module 101 and/or DVFS module 26.

Notably, a change in the outer shell 24 temperature measured by sensor 157C (or otherwise calculated from power consumption of CPU 110) may be recognized by the monitor module 114 and relayed to TM module 101. The TM module 101 may, in turn, adjust operating parameters of the various clusters in the CPU 110 to ensure that the PCD outer shell temperature 24 (i.e., skin temperature) as measured by sensor 157C is maintained below a given threshold.

From the data provided by the monitor module 114, the TM module 101 may recognize that a thermal temperature threshold has been, or could be, exceeded and determine that an operating parameter associated with active, thermally aggressive processing components (e.g., CPU 110 in the FIG. 1 illustration) should be adjusted in order to mitigate ongoing thermal energy generation while avoiding workload migration from a small processor cluster to a large processor cluster. In view of previously taken thermal mitigation measures, the TM module 101 may instruct the DVFS module 26 to determine appropriate adjustments to the performance level settings of cores in individual clusters of the CPU 110. Similarly, if the TM module 101 determines that there is available headroom to increase the performance level of the CPU 110, i.e. that user experience may be improved by an increase in power consumption that will not cause the skin temperature threshold to be exceeded or continue to rise, then the TM module 101 may work with the DVFS module 26 to determine appropriate adjustments to the operating parameters of the various clusters.

Notably, although the exemplary embodiment illustrated in FIG. 1 offers the heterogeneous, multi-cluster CPU 110 as a thermal aggressor that may be throttled according to an embodiment of an intelligent thermal management solution, it will be understood that embodiments of the solution may be applicable to any thermally aggressive heterogeneous processing component in need of throttling to affect a temperature reading as measured by a temperature sensor. As such, although the exemplary embodiment illustrates a CPU 110 being throttled in view of an outer shell temperature of a PCD 110, it is envisioned that embodiments of the solution are applicable to other combinations of sensors and heterogeneous, multi-cluster processing components. The scope of this disclosure, therefore, is not limited to the specific applications described herein.

Figure 2:
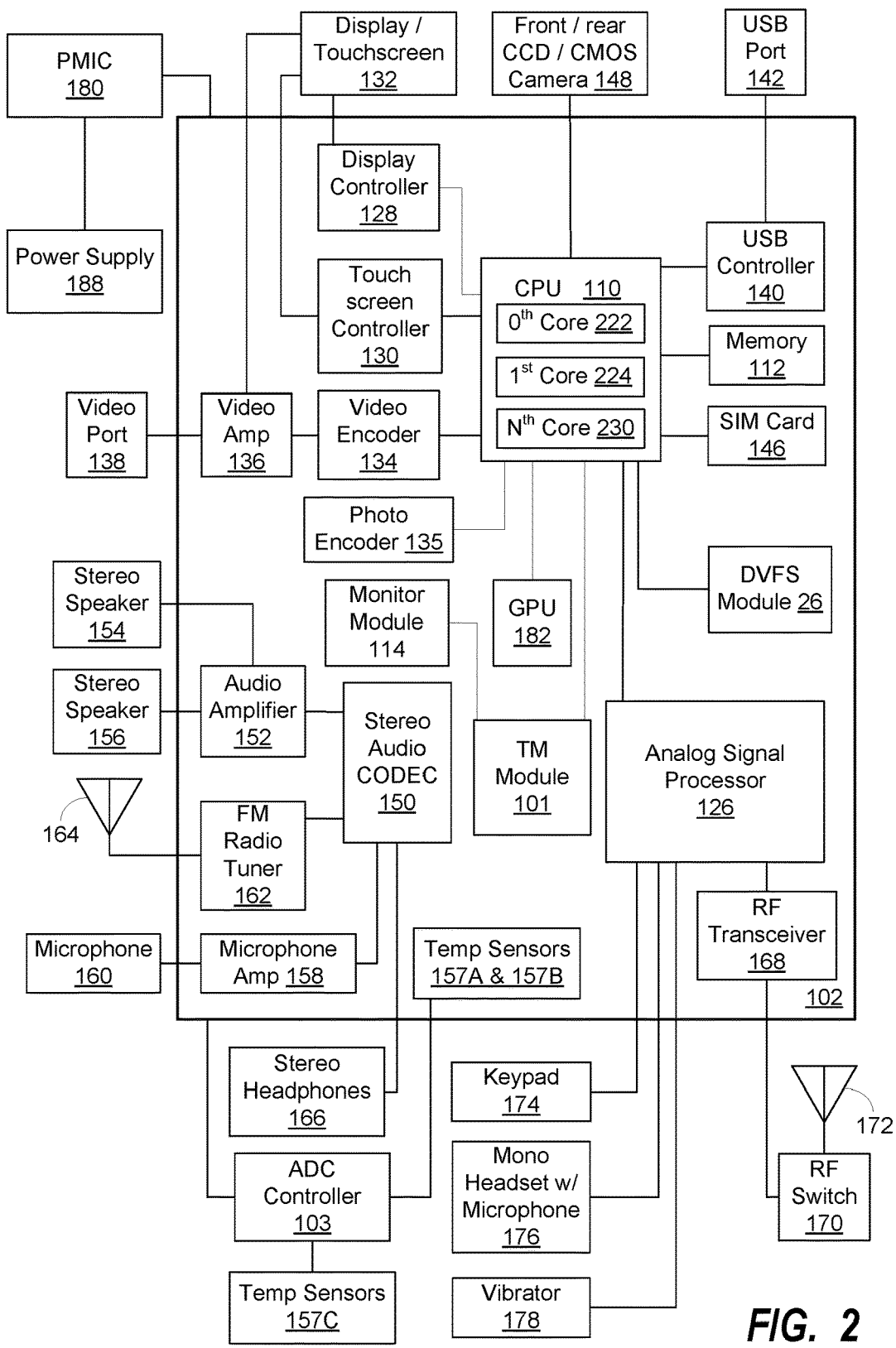
FIG. 2 is a functional block diagram illustrating an exemplary, non-limiting aspect of the PCD of FIG. 1 in the form of a wireless telephone for implementing methods and systems for intelligent thermal management in a system on a chip ("SoC") having a heterogeneous processor cluster architecture.

FIG. 2 is a functional block diagram illustrating an exemplary, non-limiting aspect of the PCD 100 of FIG. 1 in the form of a wireless telephone for implementing methods and systems for intelligent thermal management in a system on a chip ("SoC") having a heterogeneous processor cluster architecture 110. As shown, the PCD 100 includes an on-chip system 102 that includes a multi-core, multi-cluster central processing unit ("CPU") 110 and an analog signal processor 126 that are coupled together. The CPU 110 may comprise a zeroth core 222, a first core 224, and an Nth core 230 as understood by one of ordinary skill in the art. The cores of the CPU 110 may be associated into clusters having different capacities, such as a small cluster and a large cluster. Further, instead of a CPU 110, a digital signal processor ("DSP") may also be employed as understood by one of ordinary skill in the art.

In general, the monitor module 114, DVFS module 26 and TM module 101 may be collectively responsible for monitoring a temperature sensor reading, determining thermal mitigation measure sequences, and adjusting processing component cluster performance levels, such that thermal energy generation is managed and user experience is optimized. The monitor module 114 may communicate with multiple operational sensors (e.g., thermal sensors 157A, 157B) distributed throughout the on-chip system 102 and with the CPU 110 of the PCD 100 as well as with the DVFS module 26 and TM module 101. In some embodiments, monitor module 114 may monitor skin temperature sensors 157C for temperature readings associated with a touch temperature of PCD 100. In other embodiments, monitor module 114 may infer touch temperatures based on power consumption measurements. The TM module 101 may work with the monitor module 114 to identify temperature thresholds and/or power budgets that have been exceeded, determine thermal mitigation measures to apply to differing processing component clusters, and instruct the DVFS module 26 to make performance setting adjustments associated with power consuming components within clusters on the chip 102 in an effort to maintain a touch temperature below a threshold without unnecessarily impacting user experience through unintentional workload migration.

As illustrated in FIG. 2, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 188, for example a battery, is coupled to the on-chip system 102 through power management integrated circuit ("PMIC") 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157B, 157C may be employed without departing from the scope of the invention.

The TM module(s) 101 may comprise software which is executed by the CPU 110. However, the TM module(s) 101 may also be formed from hardware and/or firmware without departing from the scope of the invention. The TM module 101 may be responsible for working with the monitor module 114 and the DVFS module 26 to dynamically set and adjust performance parameters of processor clusters based on temperature readings and previous adjustments.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more DVFS module(s) 26, monitor module(s) 114 and/or TM module(s) 101. These instructions that form the module(s) 101, 26, 114 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 3:
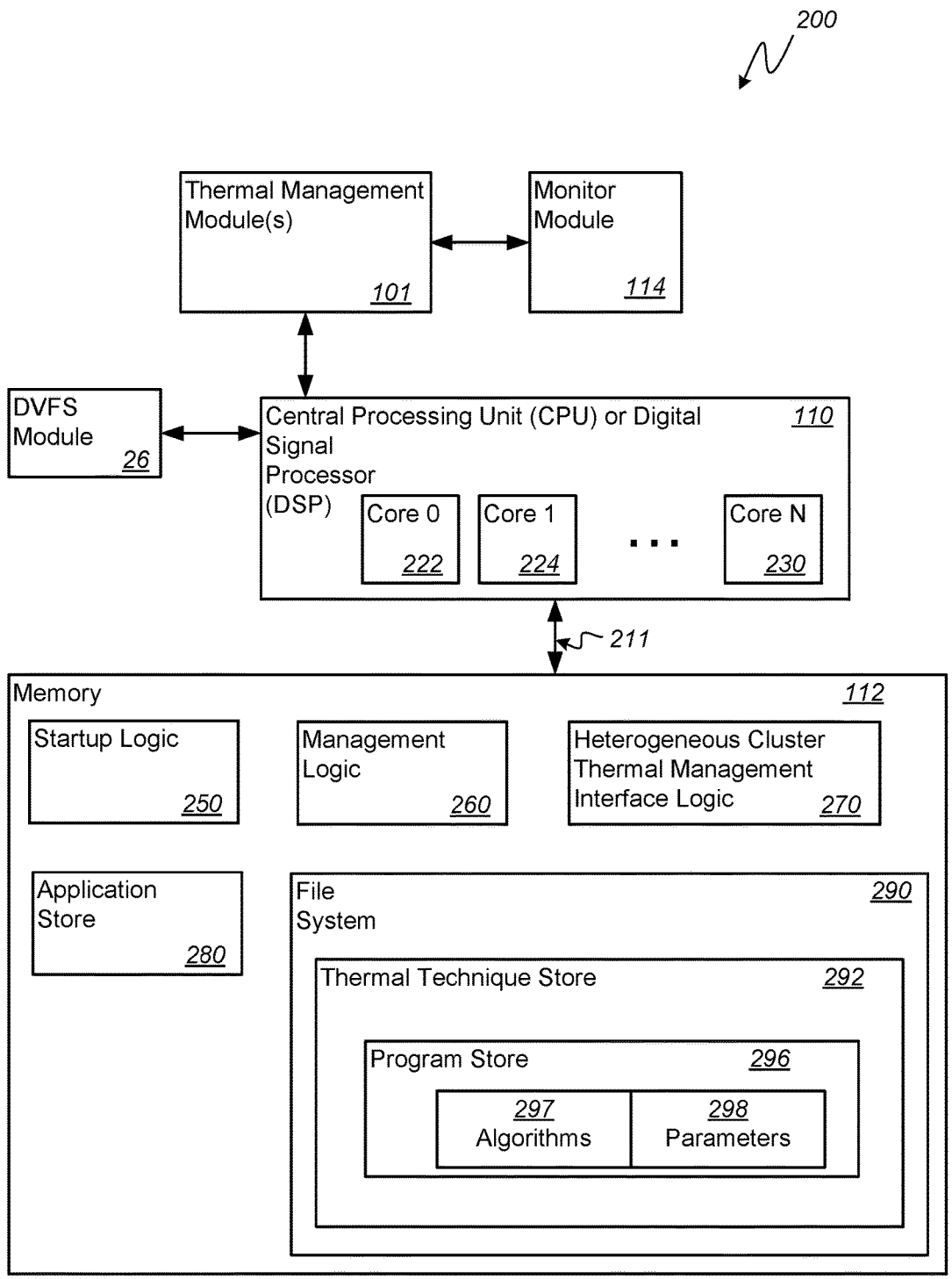
FIG. 3 is a schematic diagram illustrating an exemplary software architecture of the PCD of FIG. 2 for intelligent thermal management.

FIG. 3 is a schematic diagram illustrating an exemplary software architecture of the PCD 100 of FIG. 2 for intelligent thermal management. Any number of algorithms may form or be part of at least one intelligent thermal power management policy that may be applied by the DVFS module(s) 26, monitor module(s) 114 and/or TM module(s) 101 when certain thermal conditions are met, however, in a preferred embodiment the DVFS module(s) 26, monitor module(s) 114 and/or TM module(s) 101 work together to adjust performance level settings of active processing components organized in heterogeneous clusters. The performance level settings are adjusted in view of skin temperature measurements and previous adjustments to complimentary clusters.

As illustrated in FIG. 3, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the DVFS module(s) 26 and/or TM module(s) 101 that may comprise software and/or hardware. If embodied as software, the module(s) 26, 101 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications.

Further, the bus 211 may include address, control, and/or data connections to enable appropriate communications among the aforementioned components.

When the logic used by the PCD 100 is implemented in software, as is shown in FIG. 3, it should be noted that one or more of startup logic 250, management logic 260, heterogeneous cluster thermal management interface logic 270, applications in application store 280 and portions of the file system 290 may be stored on any computer-readable medium (or device) for use by, or in connection with, any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the thermal management interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for managing or controlling the performance of one or more of the available cores such as the first core 222, the second core 224 through to the $N^{th}$ core 230. The startup logic 250 may identify, load and execute a select program for intelligent thermal management of heterogeneous processor clusters. An exemplary select program can be found in the program store 296 of the embedded file system 290 and is defined by a specific combination of an intelligent thermal management algorithm 297 and a set of parameters 298. The exemplary select program, when executed by one or more of the core processors in the CPU 110 may operate in accordance with one or more signals provided by the monitor module 114 in combination with control signals provided by the one or more DVFS module(s) 26 and/or TM module(s) 101 to adjust the performance setting associated with a particular active component "up" or "down" or take offline (e.g., by power collapsing).

The management logic 260 includes one or more executable instructions for terminating an intelligent thermal management program, as well as selectively identifying, loading, and executing a more suitable replacement program. The management logic 260 is arranged to perform these functions at run time or while the PCD 100 is powered and in use by an operator of the device. A replacement program can be found in the program store 296 of the embedded file system 290 and, in some embodiments, may be defined by a specific combination of an intelligent thermal management algorithm 297 and a set of parameters 298.

The replacement program, when executed by one or more of the core processors in the digital signal processor may operate in accordance with one or more signals provided by the monitor module 114 or one or more signals provided on the respective control inputs of the various processor cores to adjust the settings of one or more performance parameters for processing components arranged in heterogeneous clusters.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the parameters associated with throttling a particular thermally aggressive component in a given cluster.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermal technique store 292. In this regard, the file system 290 may include a reserved section of its total file system capacity for the storage of information for the configuration and management of the various parameters 298 and algorithms 297 used by the PCD 100. As shown in FIG. 3, the store 292 includes a component store 294, which includes a program store 296, which includes one or more intelligent thermal management programs.

Figure 4:
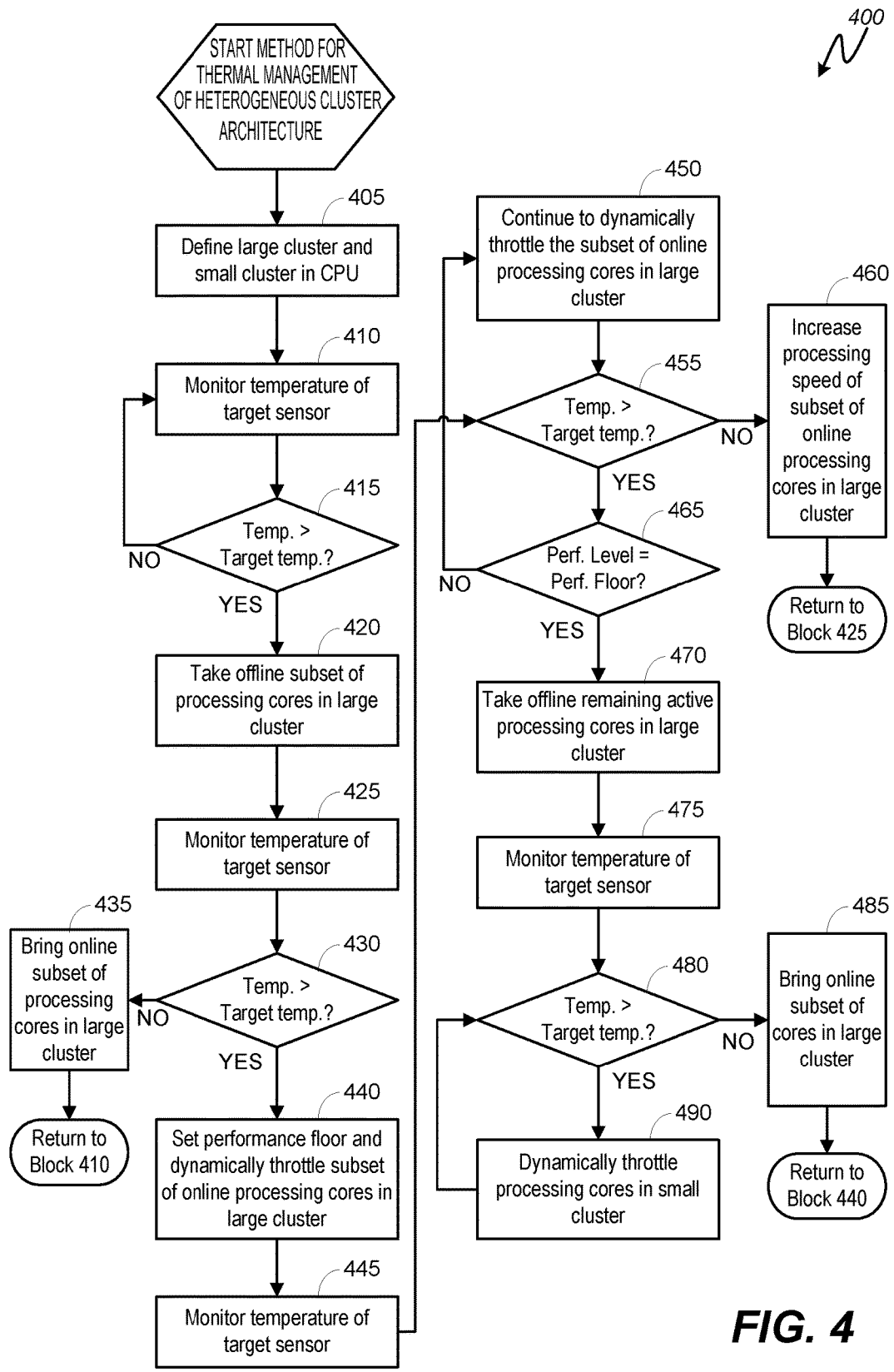
FIG. 4 depicts a logical flowchart illustrating a method for intelligent thermal management in a system on a chip ("SoC") having a heterogeneous processor cluster architecture.

FIG. 4 depicts a logical flowchart illustrating a method 400 for intelligent thermal management in a system on a chip ("SoC") having a heterogeneous processor cluster architecture. Beginning at block 405, processing cores in the CPU 110 may be organized and defined into a pair of heterogeneous clusters—a large cluster and a small cluster. At block 410, the temperature reading generated by a target sensor, such as a PCB thermistor positioned to measure the skin temperature of a PCD 100, is monitored in order to detect any violation of a target temperature threshold. At decision block 415, if the measured temperature does not exceed a target temperature, the "no" branch is followed back to block 410 and the target sensor measurement continues to be monitored. If, however, at decision block 415 it is determined that the measured temperature reading exceeds the target temperature (such as a skin temperature threshold), the "yes" branch is followed to block 420.

At block 420, in order to mitigate generation of excess thermal energy without causing unwanted workload migration from the small cluster to the large cluster, the method 400 may take a subset of processing cores associated with the large cluster offline, such as by power collapsing the subset of cores. Advantageously, by taking the subset of cores in the large cluster offline without throttling the small cluster, the method 400 effectively reduced the CPU capacity of the large cluster in order to avoid any tendency for migration of workloads currently executing on the small cluster. Subsequently, at block 425, the target sensor may be monitored for a period of time to determine if the action taken at block 420 served to sufficiently reduce the thermal energy generation. If, at decision block 430, the measured temperature is less than the target threshold then the "no" branch is followed to block 435 and the subset of cores previously taken offline at block 420 may be brought back online before the method 400 returns to 410. If, however, at decision block 430 the measured temperature has climbed or remains above the target threshold then the "yes" branch is followed to block 440.

At block 440, the method 400 may set a performance level floor for the subset of cores still online in the large cluster and then proceed to throttle the performance of the online cores, one bin setting at a time, until the performance level floor is reached. Notably, the performance level floor for the large cluster may be set in view of the maximum performance level of the cores in the small cluster; i.e., the performance level floor for the subset of online cores in the large cluster may be set such that the CPU capacity of the large cluster remains greater than the CPU capacity of the small cluster, thereby preventing any migration of workload from the small cluster to the large cluster.

After the operating parameter adjustments made at block 440, at block 445 the target sensor may be monitored for a period of time to determine if the action taken at block 440 served to sufficiently reduce the thermal energy generation. If, at decision block 455, the measured temperature is less than the target threshold then the "no" branch is followed to block 460 and the subset of cores previously throttled down at block 440 may be allowed to run at a maximum performance level (i.e., unthrottled) before the method 400 returns to 425. If, however, at decision block 455 the measured temperature has climbed or remains above the target threshold then the "yes" branch is followed to decision block 465. At decision block 465, if the current performance level of the online cores in the large cluster is above the performance level floor previously set at block 440, then the "no" branch is followed to block 450 and the online cores are further throttled before the method 400 continues back to decision block 455. If, however, at decision block 465 it is determined that the online cores in the large cluster cannot be further throttled without going under the performance level floor, then the "yes" branch is followed to block 470.

At block 470, the online cores in the large cluster may be taken offline. Subsequently, at block 475 the target sensor may be monitored for a period of time to determine if the action taken at block 470 served to sufficiently reduce the thermal energy generation. At decision block 480, if the measured temperature is less than the target temperature, then the "no" branch is followed to block 485 and the subset of cores in the large cluster previously taken offline at block 470 may be brought back online before the method returns to block 440. If, however, at decision block 480 it is determined that the measured temperature remains above the target temperature, then the "yes" branch is followed to block 490. At block 490, the method 400 proceeds to dynamically throttle the small cluster cores up and down until the thermal event clears and the subset of cores in the large cluster taken offline at block 470 are brought back online at block 485.

Figure 5:
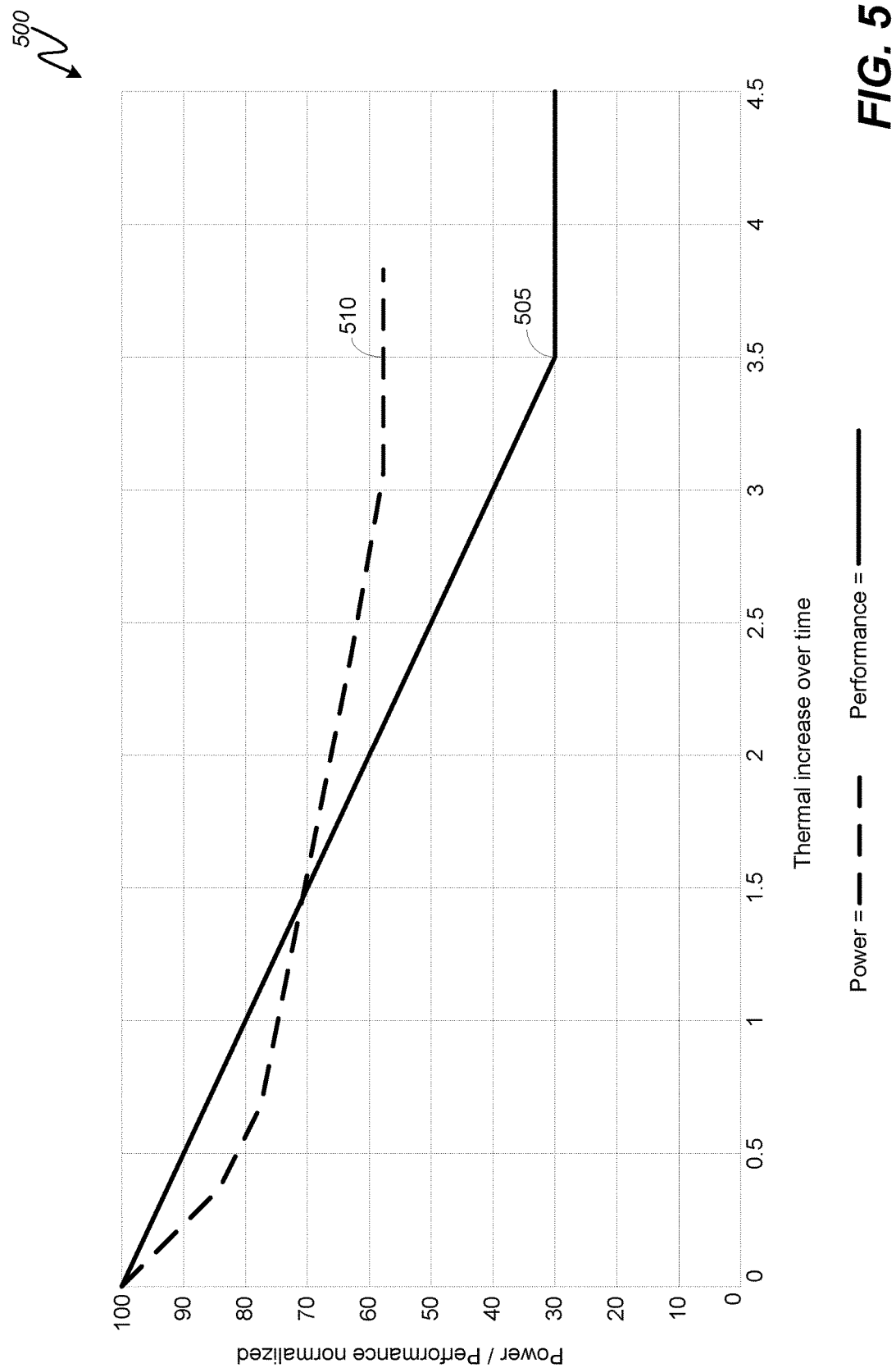
FIG. 5 is a graph illustrating an exemplary relationship between power consumption and performance for a homogeneous processor with cluster architecture subjected to a prior art thermal mitigation technique.

FIG. 5 is a graph 500 illustrating an exemplary relationship between power consumption and performance for a homogeneous processor with cluster architecture subjected to a prior art thermal mitigation technique. As can be seen in the graph 500, the performance (i.e., frequency) of the homogenous clusters is throttled linearly. That is, for every temperature sample above a threshold (threshold represented by "0" on the x-axis) the performance of the cores is reduced by a step or bin setting, as would be understood by one of ordinary skill in the art. So long as the measured temperature remains above the threshold, the technique continues to linearly scale down the performance of the cores until all cores in all clusters reach a minimum allowed performance at point 505. Notably, although the frequency for the homogenous clusters has been throttled down to a minimum at point 505 on the performance curve, point 510 and beyond on the power curve indicates that the power consumption of the cores remains relatively high due to the inherent power overhead associated with keeping each core online, albeit at a minimum frequency.

Figure 6:
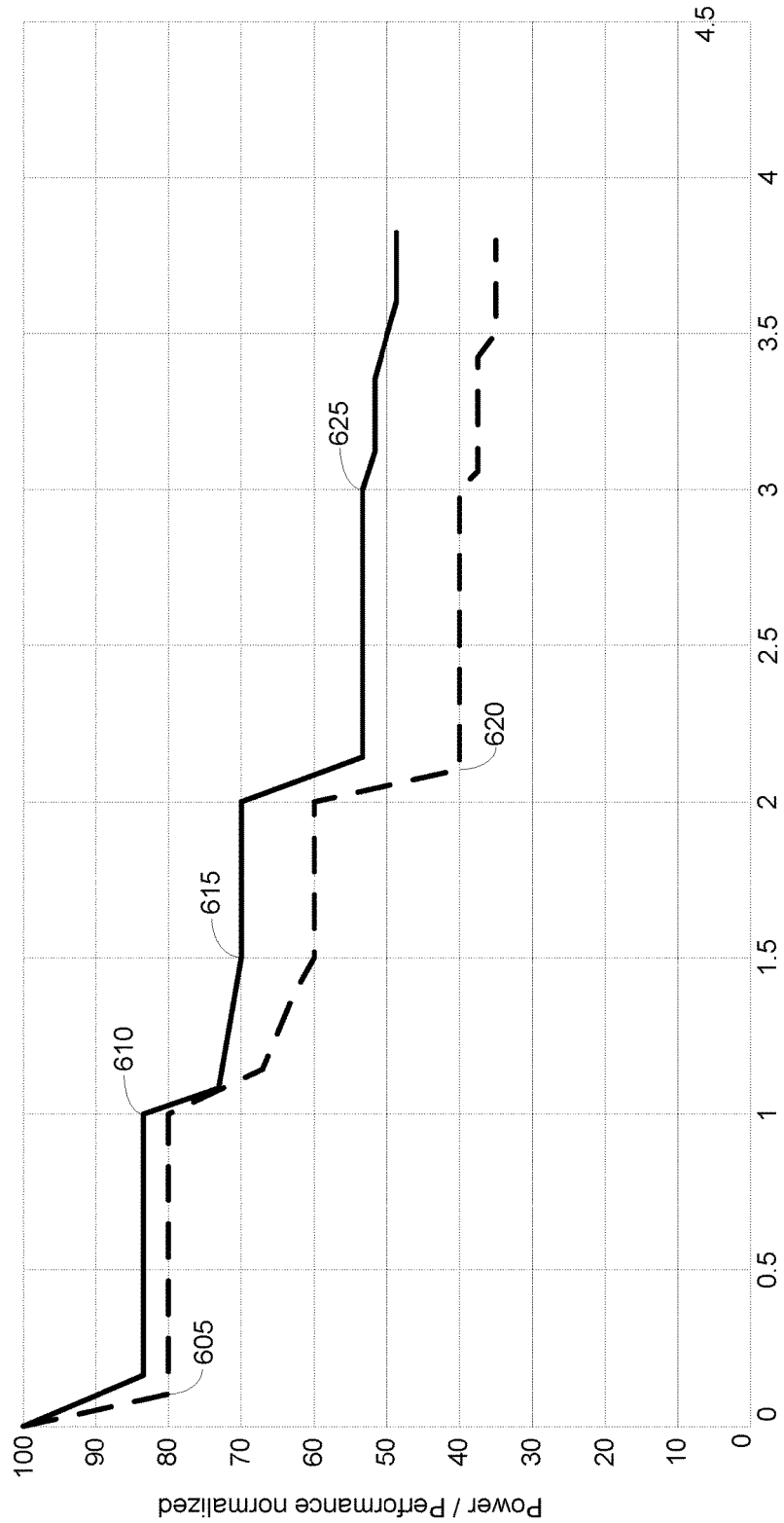
FIG. 6 is a graph illustrating an exemplary relationship between power consumption and performance for a heterogeneous processor cluster architecture subjected to an embodiment of the solution for intelligent thermal management.

FIG. 6 is a graph 600 illustrating an exemplary relationship between power consumption and performance for a heterogeneous processor cluster architecture subjected to an embodiment of the solution for intelligent thermal management. Unlike the prior art approach illustrated by the FIG. 5 graph 500 that throttles frequency only, an intelligent thermal management technique according to embodiments of the solution organize cores into heterogeneous clusters and apply thermal mitigation measures in view of both power and performance (i.e., frequency).

Looking to the graph 600, exemplary power and performance curves for a heterogeneous cluster CPU subjected to an embodiment of the solution are illustrated. When a temperature threshold is exceeded (threshold represented by "0" on the x-axis), a first response by an embodiment of the solution may be to take a subset of the cores in the "large" cluster offline to reduce overall power consumption in the CPU, as is indicated by point 605. If the temperature remains above the threshold such that additional thermal mitigation measures are warranted, the exemplary embodiment may start dynamically throttling the performance of the cores that remain online in the large cluster, as is indicated by point 610. The exemplary embodiment may continue to throttle the remaining online cores in the large cluster until a performance floor is reached for the large cluster, as is indicated by point 615. A next mitigation measure by the exemplary embodiment may be to remove or take offline the remaining active cores in the large cluster, as indicated by point 620 on the power curve.

Notably, because each mitigation measure taken by the exemplary embodiment up to this point has been applied to the large cluster, the small cluster of cores has been allowed to continue running at a highest performance level. For this reason, migration of a workload from the small cluster to the large cluster is avoided as the large cluster becomes less and less attractive for additional workload allocations. Only after the large cluster has been taken offline completely, does the exemplary method apply throttling measures to the small cluster, as indicated by point 625 on the performance curve. Advantageously, when compared to the prior art approach illustrated by the graph 500, the exemplary embodiment of an intelligent thermal management approach illustrated by the graph 600 works to minimize power consumption without unduly sacrificing performance to the detriment of QoS.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for intelligent thermal management in a portable computing device ("PCD") comprising a large cluster of processing cores and a small cluster of processing cores on an integrated circuit, the small cluster of processing cores having a peak performance capacity that is less than the peak performance capacity of the large cluster of processing cores, the large cluster of processing cores comprising a first subset of processing cores and a second subset of processing cores, the method comprising:
    monitoring a temperature reading generated by a target temperature sensor;
    determining that the temperature reading exceeds a temperature threshold;
    in response to determining that the temperature reading exceeds the temperature threshold, controlling operation of the integrated circuit by taking the first subset of the large cluster of processing cores offline while maintaining the second subset of the large cluster of processing cores online, maintaining a performance level of the small cluster of processing cores, and avoiding workload migration from the small cluster of processing cores to the second subset of the large cluster of processing cores;
    determining that the temperature reading remains in excess of the temperature threshold after the first subset of the large cluster of processing cores was taken offline;
    in response to determining that the temperature reading remains in excess of the temperature threshold after the first subset of the large cluster of processing cores was taken offline, throttling performance of the second subset of the large cluster of processing cores while avoiding throttling the performance level of the small cluster of processing cores;
    determining whether the temperature reading is less than the temperature threshold after the performance of the second subset of the large cluster of processing cores was throttled;
    in response to determining that the temperature reading is less than the temperature threshold after the performance of the second subset of the large cluster of processing cores was throttled, discontinuing to throttle the performance of the second subset of the large cluster of processing cores while maintaining the performance level of the small cluster of processing cores; and
    in response to determining that the temperature reading remains in excess of the temperature threshold after the second subset of the large cluster of processing cores was throttled as low as a minimum performance floor selected to avoid workload migration from the small cluster of processing cores, taking the second subset of the large cluster of processing cores offline, while avoiding throttling the performance level of the small cluster of processing cores before both the first and second subsets of the large cluster of processing cores have been taken offline.

2. The method of claim 1, further comprising:
    determining that the temperature reading is less than the temperature threshold; and
    in response to determining that the temperature reading is less than the temperature threshold, bringing the first subset of the large cluster of processing cores back online.

3. The method of claim 1, further comprising:
    determining that the temperature reading is less than the temperature threshold; and
    in response to determining that the temperature reading is less than the temperature threshold, bringing the second subset of the large cluster of processing cores back online.

4. The method of claim 1, further comprising:
    determining that the temperature reading remains in excess of the temperature threshold after the second subset of the large cluster of processing cores was taken offline; and
    in response to determining that the temperature reading remains in excess of the temperature threshold after the second subset of the large cluster of processing cores was taken offline, throttling the performance level of the small cluster of processing cores, wherein throttling the performance level of the small cluster of processing cores is avoided until after both the first and second subsets of the large cluster of processing cores have been taken offline.

5. The method of claim 1, wherein the temperature reading is indicative of a skin temperature of the PCD.

6. A computer system for intelligent thermal management in a portable computing device ("PCD") comprising a large cluster of processing cores and a small cluster of processing cores on an integrated circuit, the small cluster of processing cores having a peak performance capacity that is less than the peak performance capacity of the large cluster of processing cores, the large cluster of processing cores comprising a first subset of processing cores and a second subset of processing cores, the system comprising:
    a monitor module, a dynamic voltage and frequency module, and a thermal manager module collectively configured to:
        monitor a temperature reading generated by a target temperature sensor;
        determine that the temperature reading exceeds a temperature threshold;
        in response to determining that the temperature reading exceeds the temperature threshold, control operation of the integrated circuit by taking the first subset of the large cluster of processing cores offline while maintaining the second subset of the large cluster of processing cores online, maintaining performance level of the small cluster of processing cores, and avoiding workload migration from the small cluster of processing cores to the second subset of the large cluster of processing cores;

determine that the temperature reading remains in excess of the temperature threshold after the first subset of the large cluster of processing cores was taken offline;

in response to determining that the temperature reading remains in excess of the temperature threshold after the first subset of the large cluster of processing cores was taken offline, throttle performance of the second subset of the large cluster of processing cores while avoiding throttling the performance level of the small cluster processing cores;

determine whether the temperature reading is less than the temperature threshold after the performance of the second subset of the large cluster of processing cores was throttled;

in response to determining that the temperature reading is less than the temperature threshold after the performance of the second subset of the large cluster of processing cores was throttled, discontinue to throttle the performance of the second subset of the large cluster of processing cores while maintaining the performance level of the small cluster processing cores; and in response to determining that the temperature reading remains in excess of the temperature threshold after the second subset of the large cluster of processing cores was throttled as low as a minimum performance floor selected to avoid workload migration from the small cluster of processing cores, take the second subset of the large cluster of processing cores offline, while avoiding throttling the performance level of the small cluster of processing cores before both the first and second subsets of the large cluster of processing cores have been taken offline.

7. The system of claim 6, further comprising:

determining that the temperature reading is less than the temperature threshold; and in response to determining that the temperature reading is less than the temperature threshold, bringing the first subset of the large cluster of processing cores back online.

8. The system of claim 6, further comprising:

determining that the temperature reading is less than the temperature threshold; and in response to determining that the temperature reading is less than the temperature threshold, bringing the second subset of the large cluster of processing cores back online.

9. The system of claim 6, further comprising:

determining that the temperature reading remains in excess of the temperature threshold after the second subset of the large cluster of processing cores was taken offline; and in response to determining that the temperature reading remains in excess of the temperature threshold after the second subset of the large cluster of processing cores was taken offline, throttling the performance level of the small cluster of processing cores, wherein throttling the performance level of the small cluster of processing cores is avoided until after both the first and second subsets of the large cluster of processing cores have been taken offline.

10. The system of claim 6, wherein the temperature reading is indicative of a skin temperature of the PCD.

11. A computer system for intelligent thermal management in a portable computing device comprising a large cluster of processing cores and a small cluster of processing cores on an integrated circuit, the small cluster of processing cores having a peak performance capacity that is less than the peak performance capacity of the large cluster of processing cores, the large cluster of processing cores comprising a first subset of processing cores and a second subset of processing cores, the system comprising:

means for monitoring a temperature reading generated by a target temperature sensor;

means for determining that the temperature reading exceeds a temperature threshold;

means for controlling the integrated circuit, in response to determining that the temperature reading exceeds the temperature threshold, by taking the first subset of the large cluster of processing cores offline while maintaining the second subset of the large cluster of processing cores online, maintaining performance level of the small cluster of processing cores, and avoiding workload migration from the small cluster of processing cores to the second subset of the large cluster of processing cores;

means for determining that the temperature reading remains in excess of the temperature threshold after the first subset of the large cluster of processing cores was taken offline; and means for throttling performance of the second subset of the large cluster of processing cores in response to determining that the temperature reading remains in excess of the temperature threshold after the first subset of the large cluster of processing cores was taken offline while avoiding throttling the performance level of the small cluster of processing cores;

means for determining whether the temperature reading is less than the temperature threshold after the performance of the second subset of the large cluster of processing cores was throttled;

in response to determining that the temperature reading is less than the temperature threshold after the performance of the second subset of the large cluster of processing cores was throttled, means for discontinuing to throttle the performance of the second subset of the large cluster of processing cores while maintaining the performance level of the small cluster of processing cores; and in response to determining that the temperature reading remains in excess of the temperature threshold after the second subset of the large cluster of processing cores was throttled as low as a minimum performance floor selected to avoid workload migration from the small cluster of processing cores, means for taking the second subset of the large cluster of processing cores offline, while avoiding throttling the performance level of the small cluster of processing cores before both the first and second subsets of the large cluster of processing cores have been taken offline.

12. The computer system of claim 11, further comprising:

means for determining that the temperature reading is less than the temperature threshold; and in response to determining that the temperature reading is less than the temperature threshold, means for bringing the first subset of the large cluster of processing cores back online.

13. The computer system of claim 11, further comprising:

means for determining that the temperature reading is less than the temperature threshold; and in response to determining that the temperature reading is less than the temperature threshold, means for bringing the second subset of the large cluster of processing cores back online.

14. The computer system of claim 11, further comprising:
means for determining that the temperature reading remains in excess of the temperature threshold after the second subset of the large cluster of processing cores was taken offline; and
in response to determining that the temperature reading remains in excess of the temperature threshold after the second subset of the large cluster of processing cores was taken offline, means for throttling the performance level of the small cluster of processing cores, wherein throttling the performance level of the small cluster of processing cores is avoided until after both the first and second subsets of the large cluster of processing cores have been taken offline.

15. A computer program product comprising a non-transitory computer usable device having a computer readable program code embodied therein, said computer readable program code adapted to be executed to implement a method for intelligent thermal management in a portable computing device comprising a large cluster of processing cores and a small cluster of processing cores on an integrated circuit, the small cluster having a peak performance capacity that is less than the peak performance capacity of the large cluster of processing cores, the large cluster of processing cores comprising a first subset of processing cores and a second subset of processing cores, said method comprising:
monitoring a temperature reading generated by a target temperature sensor;
determining that the temperature reading exceeds a temperature threshold;
in response to determining that the temperature reading exceeds the temperature threshold, controlling operation of the integrated circuit by taking a first subset of the large cluster processing cores offline while maintaining the second subset of the large cluster processing cores online, maintaining tho performance level of the small cluster of processing cores, and avoiding workload migration from the small cluster of processing cores to the second subset of the large cluster of processing cores;
determining that the temperature reading remains in excess of the temperature threshold after the first subset of the large cluster of processing cores was taken offline; and
in response to determining that the temperature reading remains in excess of the temperature threshold after the first subset of the large cluster of processing cores was taken offline, throttling the performance of the second subset of the large cluster of processing cores while avoiding throttling the performance level of the small cluster of processing cores;

determining whether the temperature reading is less than the temperature threshold after the performance of the second subset of the large cluster of processing cores was throttled;
in response to determining that the temperature reading is less than the temperature threshold after the performance of the second subset of the large cluster of processing cores was throttled, discontinuing to throttle the performance of the second subset of the large cluster of processing cores while maintaining the performance level of the small cluster of processing cores; and
in response to determining that the temperature reading remains in excess of the temperature threshold after the second subset of the large cluster of processing cores was throttled as low as a minimum performance floor selected to avoid workload migration from the small cluster of processing cores, taking the second subset of the large cluster of processing cores offline, while avoiding throttling the performance level of the small cluster of processing cores before both the first and second subsets of the large cluster of processing cores have been taken offline.

16. The computer program product of claim 15, further comprising:
determining that the temperature reading is less than the temperature threshold; and
in response to determining that the temperature reading is less than the temperature threshold, bringing the first subset of the large cluster of processing cores back online.

17. The computer program product of claim 15, further comprising:
determining that the temperature reading is less than the temperature threshold; and
in response to determining that the temperature reading is less than the temperature threshold, bringing the second subset of the large cluster of processing cores back online.

18. The computer program product of claim 15, further comprising:
determining that the temperature reading remains in excess of the temperature threshold after the second subset of the large cluster of processing cores was taken offline; and
in response to determining that the temperature reading remains in excess of the temperature threshold after the second subset of the large cluster of processing cores was taken offline, throttling the performance level of the small cluster of processing cores, wherein throttling the performance of the small cluster of processing cores is avoided until after both the first and second subsets of the large cluster of processing cores have been taken offline.

* * * * *